Oct. 9, 1951  H. H. TURNER  2,570,290
ONE-WAY CLUTCH
Filed Dec. 19, 1946
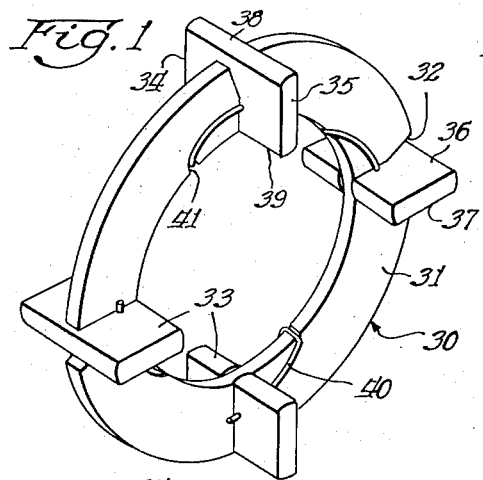
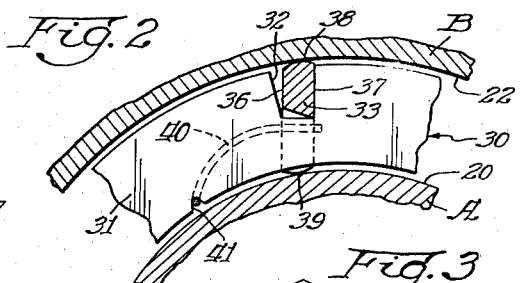
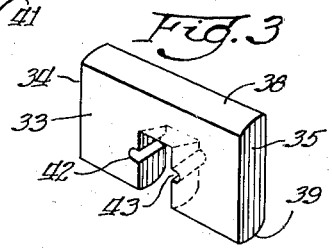
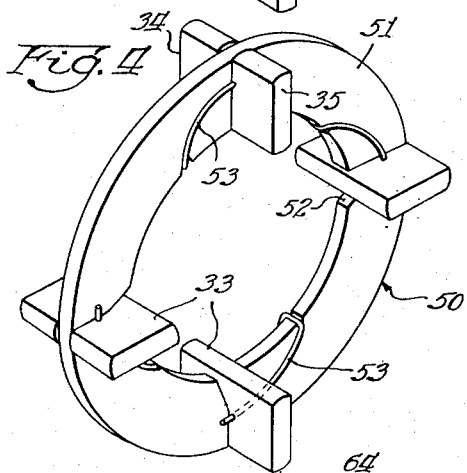
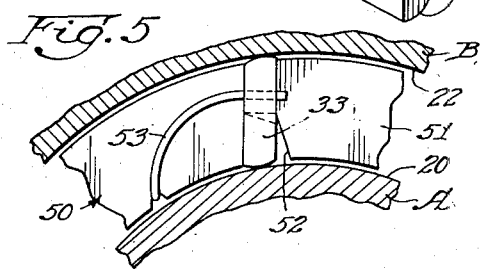
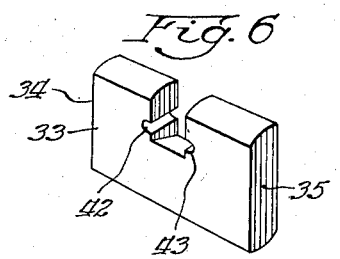
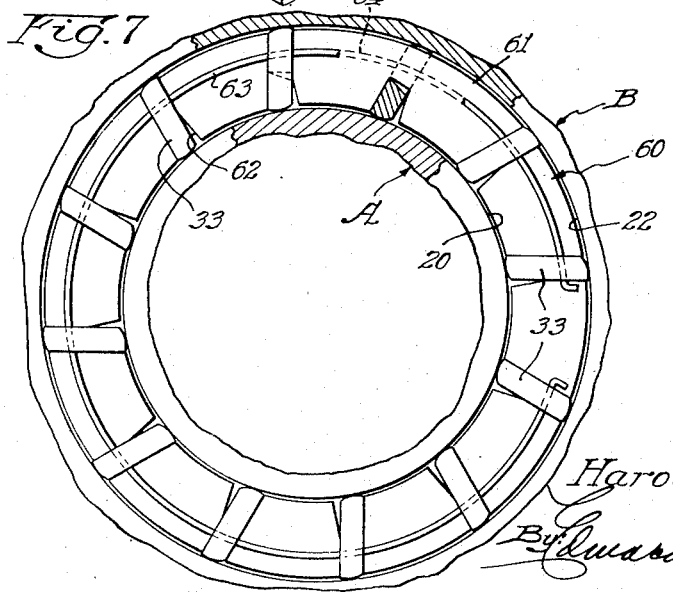
Inventor:
Harold H. Turner
By Edward C. Gutzeugh
Atty.

Patented Oct. 9, 1951

2,570,290

UNITED STATES PATENT OFFICE 2,570,290

ONE-WAY CLUTCH

Harold H. Turner, Rockford, Ill., assignor to Borg-Warner Corporation, Chicago, Ill., a corporation of Illinois Application December 19, 1946, Serial No. 717,257

13 Claims. (Cl. 192—45.2)

The invention relates to clutches and is particularly concerned with clutches of the one-way type.

An object and accomplishment of the invention is to improve the construction of one-way clutches as contemplated herein with respect to efficiency of operation and economy in their manufacture, and to this end a feature of the invention is to provide a one-way clutch generally comprising an annular washer-shaped sprag carrier, said sprag carrier being provided with a plurality of recesses adapted to receive suitable sprags, said sprag carrier being operatively disposed between a driving and driven member and intermediate of the ends of the sprags, and individual spring means arranged an assembled on said sprag carrier and in engagement with the sprags, thereby to cause suitable spring tension against the sprag when assembled in its operative position.

The invention seeks as a principal object and accomplishment, to provide a one-way clutch such as contemplated herein and characterized by a combination of parts arranged and adapted to provide a compact assembly which will successfully combine the factors of structural simplicity, efficiency and durability, and yet be economical to manufacture.

Another object of the invention is to provide a one-way clutch of the above character whereby a uniform pressure against the sprags is effected to effectively provide uniform loading.

The invention has for a further object to provide a one-way clutch of the above character wherein the sprags are provided with individual spring means arranged and mounted in such a manner as to eliminate the possibility of a spring becoming detached and be free to interfere with the function and operation of the other springs in the event of an individual spring failure.

The invention further contemplates the provision of a simply constructed one-way clutch that is capable of being made of small dimensions.

A further object of the invention is to provide an effective one-way clutch that is made of few parts, that may be quickly assembled and which will operate instantaneously upon reversal of the rotation of the driving member.

Additional objects, features and advantages of the invention disclosed herein will be apparent to persons skilled in the art after the construction and operation are understood from the within description.

It is preferred to accomplish the various objects of this invention and to practice the same in substantially the manner hereinafter fully described and as more particularly pointed out in the appended claims, reference being had to the accompanying drawing which forms a part of this specification, wherein:

Fig. 1 is a perspective view of a one-way clutch embodying the present invention;

Fig. 2 is a fragmentary side elevational view of the one-way clutch depicted in Fig. 1 and wherein certain parts of the clutch are shown in section to more clearly show the construction thereof;

Fig. 3 is a perspective view of a sprag such as contemplated for employment in the one-way clutch depicted in Fig. 1;

Fig. 4 is a perspective view of a modified form of a one-way clutch contemplated by the present invention;

Fig. 5 is a fragmentary side elevational view of the one-way clutch depicted in Fig. 4;

Fig. 6 is a perspective view of a sprag such as contemplated for employment in the one-way clutch depicted in Fig. 4; and Fig. 7 is a side elevational view of another modified form of a one-way clutch contemplated by the present invention.

The drawing is to be understood as being more or less of a schematic character for the purpose of illustrating and disclosing typical or preferred forms of the improvements contemplated herein, and in the drawing like reference characters identify the same parts in the several views.

Referring to the drawing, specifically Figs. 2, 5 and 7, I have illustrated the present one-way clutch assembled in an operative position between a driven member which I have designated in its entirety by the letter A and a driving member which I have designated in its entirety by the letter B. In some applications, it may be preferable to have the driving and driven elements in reversed positions.

The driven member A is provided with a smooth cylindrical peripheral surface 20 adapted to be employed as an inner race for the one-way clutch to be hereinafter described in detail.

The driving member B is provided with a smooth inner cylindrical surface 22 concentrically arranged in spaced relationship with the race 20 and adapted to form an outer race for the one-way clutch.

It will be observed that the arrangement of the one-way clutch to be hereinafter described in detail is such as to effectively couple the driving and driven members in one direction of operation and to release these members when the direction of operation is reversed so that either the driving member or the driven member may be rotated independently of the other member.

Suffice it to say, since the invention is not particularly concerned with the precise construction of the driving and driven members generally, they will not be further described in detail. It is to be understood that details of construction of these members may be modified to suit particular conditions, and may in some cases include suitable anti-friction devices, but I do not wish to be limited to the details of construction of these elements as set forth.

Having thus described the general environment surrounding the one-way clutch with which the present invention is particularly concerned, the specific construction and the cooperating functions of the parts of said one-way clutch will now be described in detail.

In the exemplary embodiment of the invention depicted in Figs. 1, 2 and 3, the one-way clutch assembly is designated in its entirety by the numeral 30 and comprises generally, a single annular washer-shaped sprag carrier 31, said carrier being provided with suitable recesses 32 opening from the outer peripheral edge of the sprag carrier and each recess being adapted to receive a sprag 33, said sprag carrier being preferably positioned intermediate the ends 34 and 35 of the sprags, and individual spring means as at 40 arranged and assembled on said sprag carrier adjacent each sprag, thereby to cause suitable spring tension against the sprag when assembled in its operative position between the driving member B and the driven member A.

It is notable that the recesses are so constructed with the sides thereof at predetermined angles for engagement with the sprags to restrict rotation of the sprag when assembled in its operative position.

In accordance with this invention, the sprags 33 are prismatic in section having straight parallel sides 36 and 37 and a top 38 and a bottom 39, said top and bottom being formed on circular arcs struck about centers spaced widthwise of the sprags so that the diagonal length in one direction is greater than that in the other direction, thereby to cause the wedging angle to increase as the grip of the sprags on the driving and driven members tightens which increases the torque capacity of the clutch.

The sprags 33 normally lie at angles to radii struck through the center of the driven member A as shown in Fig. 2, and when tilted in this position will permit clockwise rotation of the driving member B relative to the driven member A. If the driving member B should attempt to turn counterclockwise relative to the driven member A, or if the driven member A should overrun the driving member B, the sprags 33 will be locked to more nearly radial position and will bind against the races 20 and 22 to hold the driven and driving members against rotation with respect to each other.

It is notable that the top 38 and the bottom 39 of the sprags engage the races 22 and 20, respectively, in such a way that when the driving member B is rotated counterclockwise relative to the driven member A, the sprags tend to rotate into a position in which they wedgingly engage the races to prevent relative rotation between the driven and driving members. It is to be understood that the race of the driving member B will be free to rotate in a clockwise direction as noted above, but if the driven member A should tend to overrun the driving member B in a clockwise direction, the engagement of the top 38 and the bottom 39 of the sprags 33 with their respective races will tilt the sprags and force them into tight engagement with the races thereby locking the races against relative rotation.

It has been found desirable to provide a uniform resilient pressure against the sprags, which will cause the proper seating thereof and hold them in their operative positions. It is particularly desirable to provide a slight pressure at each side of the center of the sprag, as shown in Figs. 1 and 2, which will permit the ends 34 and 35 of the sprags to move slightly at angles with respect to a line parallel to the axis of the driving and driven members to facilitate proper seating of the top 38 and the bottom 39 of the sprags against their respective related races. This feature is advantageously accomplished in the present invention by the employment of spring means as at 40 comprising a wire spring, of suitable thickness and tension, defining convolutions formed substantially of U-shape, the bottom of U being adapted to be received into a recess 41 located on the inner peripheral edge of the sprag carrier 30, and having the free end portions thereof adaptable to be received into recesses 42 and 43 located in the sprag proper, thereby to provide a slight spring tension against the sprag when assembled in its operative position. With this construction and arrangement of parts, quick positive action in the proper seating and wedging of the sprags between the driven and driving members is accomplished.

The present clutch may be made in comparatively small dimensions. Heretofore, with the arrangements found in the prior art, it was not practical to construct a clutch of small dimensions as found in the present invention, and yet have the advantages found in the present invention.

The construction illustrated in Figs. 4 and 5 is substantially similar in most respects to that illustrated in Figs. 1 and 2, and parts therein corresponding to like parts in Figs. 1 and 2 have been indicated by the same numerals.

In the embodiment of the invention depicted in Figs. 4 and 5, the one-way clutch assembly is designated in its entirety by the numeral 50 and comprises generally, a single annular washer-shaped sprag carried 51, said carrier being provided with suitable recesses 52 opening from the inner peripheral edge of the sprag carrier 50 and each recess being adapted to receive a sprag 33, said sprag carrier being preferably positioned intermediate the ends 34 and 35 of the sprags, and individual spring means as at 53 arranged and assembled on said sprag carrier adjacent each sprag, thereby to cause suitable spring tension against the sprag when assembled in its operative position between the driving member B and the driven member A. It is notable that in some adaptations it may be advantageous and desirable to have the recesses 32, as shown in Fig. 2, located as at 52 in Figs. 4 and 5 so that they will open into the inner peripheral edge of the sprag carrier, as shown in Fig. 5. It is to be understood that the sprags all will be substantially of the same design as shown in Fig. 3, but will be inverted as shown in Fig. 6. Moreover, it is notable that the wire spring 53 is substantially of the same construction as that of spring 40, illustrated in Fig. 1.

The construction of Fig. 7 is substantially similar in most respects to that of Figs. 4, 5 and 6, and parts therein corresponding to like parts in Figs. 4, 5 and 6 have been indicated by the same numerals.

In some adaptations, it may be advantageous and desirable to provide a great number of sprags in the assembly. In the embodiment of the invention depicted in Fig. 7, the one-way clutch assembly is designated in its entirely by the numeral 60 and comprises generally, a single annular washer-shaped sprag carrier 61, said carrier being provided with a plurality of suitable recesses 62 opening from the inner peripheral edge of the sprag carrier 61 and each recess being adapted to receive a sprag 33 (Fig. 6), said sprag carrier being preferably positioned intermediate the ends 34 and 35 of the sprags, and spring means as at 63 and 64 formed of wire stock of suitable thickness and tension and arranged at each side of the sprag carrier, the spring 63 being adaptable to be received into the recess 42 of the sprags and the spring 64 being adaptable to be received into the recesses 43 of the sprags, thereby to cause suitable spring tension against the sprags when assembled in their operative position between the driving member B and the driven member A. This spring construction posseses the advantages of the spring construction hereinbefore described and in addition thereto, permits a large number of sprags to be carried by the sprag carrier. This is important where it is desired to employ a one-way clutch of small dimensions and having a high torque capacity.

From the foregoing disclosure, it can be seen that I have provided a one-way clutch which efficiently fulfills the objects hereinbefore set forth and provides numerous advantages which may be summarized as follows:

(1) Structurally simple, efficient and durable;
(2) Economical to manufacture and readily adaptable to mass production manufacture;
(3) Capable of being made in small dimensions; and
(4) Quick acting.

While I have illustrated a preferred embodiment of my invention, many modifications may be made without departing from the spirit of the invention, and I do not wish to be limited to the precise details of construction set forth, but desire to avail myself of all changes within the scope of the appended claims.

I claim:

1. In a one-way engaging device for use with and adapted to be disposed between relatively rotatable members in concentric spaced relationship, an annular washer-shaped carrier provided with a plurality of recesses, a plurality of sprags each adaptable to be received in one of said recesses and to be operatively carried by said carrier, said sprag carrier being disposed intermediate the ends of the sprags, and individual spring means arranged and assembled on said sprag carrier and in engagement with the sprags, thereby to cause a relatively light spring tension against the sprags when the device is positioned between said members.

2. In a one-way engaging device, the combination of an annular washer-shaped carrier, a plurality of sprags operatively carried by said carrier, said sprags being prismatic in section and having surfaces formed on arcs struck about centers spaced widthwise of the sprags so that the diagonal length in one direction is greater than that in the other direction, said carrier being disposed intermediate the ends of said sprags, and resilient means engaged with said sprags to maintain said sprags in assembled relationship.

3. A one-way engaging device adaptable to be positioned between spaced co-axially arranged relatively rotatable members comprising an annular washer-shaped sprag carrier provided with a plurality of recesses, a plurality of sprags each adaptable to be received in one of said recesses and to be operatively carried by said carrier and each having a plurality of recesses, said sprags being prismatic in section and having surfaces formed on circular arcs struck about centers spaced widthwise of the sprags so that the diagonal length in one direction is greater than that in the other direction, said sprag carrier being disposed intermediate the ends of the sprags, and individual spring means for each sprag comprising a wire spring defining convolutions formed substantially of U-shape, the bottom of the U being adapted to engage the sprag carrier and the free end portions thereof being adaptable to be received into the recesses in the sprags thereby to provide a slight spring tension against the sprags when the device is positioned between said relatively rotatable members.

4. In a one-way engaging device, the combination of an annular washer-shaped sprag carrier, a plurality of sprags operatively carried by said carrier, said sprags having surfaces formed on circular arcs struck about centers spaced widthwise of the sprags so that the diagonal length in one direction is greater than that in the other direction, said carrier being disposed between the ends of said sprags, and spring means engaged with said sprags to maintain said sprags in assembled relationship.

5. In one-way engaging device, the combination of an annular washer-shaped carrier having a plurality of recesses, a plurality of sprags each adaptable to be received in one of said recesses, said sprags having arcuate surfaces formed so that the diagonal length of the sprags in one direction is greater than that in the other direction, and individual spring means for each sprag comprising a wire spring defining convolutions formed substantially of U-shape, the bottom of the U being adapted to engage the sprag carrier and the free end portions thereof being adaptable to be received into the recesses in the sprags thereby to provide a slight spring tension against the sprags.

6. A one-way engaging device adaptable to be positioned between spaced co-axially arranged relatively rotatable members comprising an annular carrier, a plurality of sprags operatively carried by said carrier and having a plurality of recesses, said sprags being prismatic in section and having surfaces formed on circular arcs struck about centers spaced widthwise of the sprags so that the diagonal length in one direction is greater than that in the other direction, said sprag carrier being disposed intermediate the ends of the sprags, and individual spring means for each sprag comprising a wire spring defining convolutions formed substantially of U-shape, the bottom of the U being adapted to engage the sprag carrier and the free end portions thereof being adaptable to be received into the recesses in the sprags thereby to provide a slight spring tension against the sprags when the device is positioned between said relatively rotatable members.

7. A one-way engaging means adaptable to be positioned between spaced co-axially arranged relatively rotatable members comprising an annular washer-shaped sprag carrier provided with a plurality of recesses, a plurality of sprags each adaptable to be received in one of said recesses and to be operatively carried by said carrier and each having a plurality of recesses, said sprags having arcuate surfaces so that the diagonal length of the sprags in one direction is greater than that in the other direction, said sprag carrier being disposed between the ends of the sprags, and means comprising a wire spring adaptable to be received into the recesses in the sprags thereby to provide a slight spring tension against the sprags when the device is positioned between the relatively rotatable members.

8. A one-way engaging device adaptable to be positioned between spaced co-axially arranged relatively rotatable members comprising an annular carrier, a plurality of sprags operatively carried by said carrier and each having a plurality of recesses, and springs means for each sprag comprising a wire spring defining convolutions formed substantially of U-shape, the bottom of the U being adapted to engage the sprag carrier and the free end portions thereof being adaptable to be received into the recesses in the sprags thereby to provide a relatively light spring tension against the sprags when the device is positioned between the relatively rotatable members.

9. In a one-way engaging device, an annular washer-shaped sprag carrier, a plurality of sprags carried by said carrier, said sprag carrier being operatively disposed intermediate of the ends of the sprags, and said sprags having arcuate surfaces formed so that the diagonal length of the sprags in one direction is greater than that in the other direction.

10. In a one-way engaging device, an annular sprag carrier, sprags having recesses therein extending radially of said annular carrier and receiving said carrier, and spring means engaged with said sprags to provide spring tension against said sprags to maintain said sprags in predetermined positions with respect to said carrier.

11. In a one-way engaging device adaptable to be positioned between spaced coaxially arranged relatively rotatable members comprising an annular carrier, and a plurality of wedge elements adapted to permit rotation of one member relative to the other member in one direction and providing a wedging action on said members preventing rotation of said one member relative to said other member in the other direction, each of said elements having a recess between its ends extending radially of said carrier for receiving said carrier, and spring means engaged with said elements for providing spring tension against the elements to effect said wedging action of said elements on said members.

12. In a one-way engaging device adapted to be disposed between two coaxially spaced relatively rotatable members, wedging elements adapted to wedgingly engage said members in one direction of relative rotation and to release the same in the opposite direction of rotation, a carrier for said elements disposed between the ends of said elements and having a loosely interlocking connection with said elements, and spring means engaged with said elements and positioning said elements to effect said wedging engagement of said elements with said members.

13. In a one-way engaging device, the combination of an annular washer-shaped carrier having generally radially extending recesses, wedging elements operatively carried by said carrier and each having a radially extending recess between the ends thereof, the recesses in said carrier receiving said elements and the recesses in said elements receiving said carrier, and spring means engaged with said elements.

HAROLD H. TURNER.

REFERENCES CITED

The following references are of record in the file of this patent:

UNITED STATES PATENTS

| Number | Name | Date |
| --- | --- | --- |
| 209,456 | Burrows | Oct. 29, 1878 |
| 2,028,876 | Lotts | Jan. 28, 1936 |
| 2,039,149 | Dodge | Apr. 28, 1936 |
| 2,054,222 | Lapsley | Sept. 15, 1936 |
| 2,366,843 | Dodge et al. | Jan. 9, 1945 |
| 2,407,772 | Dodge | Sept. 17, 1946 |
| 2,408,962 | Swenson et al. | Oct. 8, 1946 |
| 2,427,120 | Blair | Sept. 9, 1947 |
| 2,428,962 | Davis | Oct. 14, 1947 |

FOREIGN PATENTS

| Number | Country | Date |
| --- | --- | --- |
| 756,885 | France | Oct. 2, 1933 |